(No Model.)
A. HOLMQUIST.
FEED SCREW AND NUT FOR THE SAME.
No. 439,660. Patented Nov. 4, 1890.
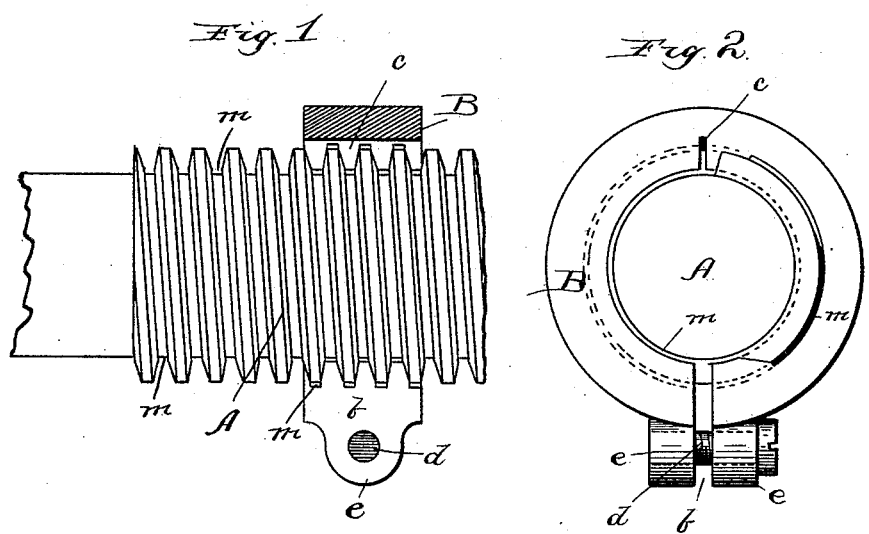
Witnesses:
Geo. E. Curtis
Emma Hack
Inventor:
August Holmquist
By Munday, Evarts & Adcock
His Attorneys.

UNITED STATES PATENT OFFICE.

AUGUST HOLMQUIST, OF CHICAGO, ILLINOIS, ASSIGNOR TO HIMSELF AND CHARLES H. DURPHY, OF SAME PLACE.

FEED-SCREW AND NUT FOR THE SAME.

SPECIFICATION forming part of Letters Patent No. 439,660, dated November 4, 1890.

Application filed May 19, 1890. Serial No. 352,323. (No model.)

*To all whom it may concern:*

Be it known that I, AUGUST HOLMQUIST, a citizen of the United States, residing at Chicago, in the county of Cook and State of Illinois, have invented a new and useful Improvement in Feed-Screws, of which the following is a specification.

This invention is designed more particularly to remove the objection pertaining to the ordinary construction of feed-screws and nuts growing out of the lost motion caused by the wearing away of the thread. It is adapted to be used, however, in all places where the wear produces any objectionable looseness of fit or lost motion between a screw and its nut.

In my invention I employ a screw the thread whereof has inclined sides, and a nut having a corresponding thread and adapted to be tightened upon the screw, and provide both nut and screw with channels at the bottom of the thread-spaces, as hereinafter set forth, the latter feature allowing the nut to be tightened whenever necessary to compensate for the wear.

In the drawings, Figure 1 is a longitudinal sectional view of a screw and nut embodying my invention. Fig. 2 is an end view of the same.

In said drawings, A may represent the feed-screw of a lathe or any other screw between which and the nut with which it engages it is desirable to maintain such a close fit as will prevent all lost motion.

B may represent the nut fitted upon screw A. It may be of any known construction which will permit it to be tightened upon the screw. The type of nut which I have shown is split at one side, as at $b$, with provision by means of the notch $c$ at the opposite side to allow it to be drawn together at $b$ by the screw $d$ passing through one of the ears $e$ and threaded in the other ear, these ears being rigid upon the nut; but I do not wish to be limited to any particular form of nut, as my invention is applicable to any construction capable of being tightened.

The thread employed for the screw and nut may be of any ordinary form, provided the sides thereof be inclined so as to render the thread tapering from base to periphery. The form of the thread-top is also immaterial. The novel feature of the thread is found in the provision in both screw and nut at the bottom of the spaces between the threads of channels adapted to prevent any contact between the tops of the threads and the bottoms of the spaces, and to give room to the tops of the opposing threads when the latter are forced to enter farther within the spaces by the tightening of the nut. These channels are formed by cutting out or deepening the spaces, as shown at $m$, Fig. 1. Said channels $m$ are preferably vertical sided, as shown, as thereby is obviated all danger of the formation by wear of shoulders or obstructions upon the sides of the threads or the channels tending to obstruct the tightening.

In my invention the wear reduces the thickness of the threads and correspondingly widens the spaces between them. Being furnished with inclined sides this wear is readily taken up whenever necessary by tightening the nut, and in this tightening the channels $m$ give room to the thread-tops.

I claim—

1. The combination of the screw and the divided nut capable of being tightened thereon and a tightening device for the nut, both screw and nut being provided with corresponding threads and with channels at the bottom of the thread-spaces adapted to permit the tightening of the nut and the taking up of the wear, substantially as specified.

2. The combination of the screw and the divided nut capable of being tightened thereon and a tightening device for the nut, both screw and nut being provided with corresponding threads and with vertical-sided channels at the bottom of the thread-spaces adapted to permit the tightening of the nut and the taking up of the wear, substantially as set forth.

3. The combination of a screw provided with tapering threads and with channels at the bottom of the thread-spaces, and a divided nut provided with corresponding threads and channels, and a tightening device mounted upon and carried by the nut and adapted to take up wear, substantially as set forth.

4. The combination of a screw provided with tapering threads and with channels at the bottom of the thread-spaces, a nut divided upon one side and provided with corresponding threads and channels, and a screw $d$, adapted to take up wear, substantially as set forth.

AUGUST HOLMQUIST.

Witnesses:
H. M. MUNDAY,
EMMA HACK.